United States Patent
Tomasi et al.

(10) Patent No.: US 11,782,988 B2
(45) Date of Patent: Oct. 10, 2023

(54) QUERY UNDERSTANDING METHODS AND SYSTEMS

(71) Applicant: Spotify AB, Stockholm (SE)

(72) Inventors: Federico Tomasi, London (GB); Rishabh Mehrotra, London (GB); Brian Christian Peter Brost, Brooklyn, NY (US); Aasish Kumar Pappu, Jersey City, NJ (US); Hugo Flávio Ventura Galvão, Stockholm (SE); Mounia Lalmas-Roelleke, Saffron Walden (GB)

(73) Assignee: Spotify AB, Stockholm (SE)

( * ) Notice: Subject to any disclaimer, the term of this patent is extended or adjusted under 35 U.S.C. 154(b) by 359 days.

(21) Appl. No.: 17/027,239

(22) Filed: Sep. 21, 2020

(65) Prior Publication Data

US 2022/0092118 A1    Mar. 24, 2022

(51) Int. Cl.
| | | |
|---|---|---|
| G06F 16/9035 | (2019.01) | |
| G06F 16/9038 | (2019.01) | |
| G06N 5/025 | (2023.01) | |
| G06N 3/04 | (2023.01) | |
| G06F 18/22 | (2023.01) | |
| G06F 18/214 | (2023.01) | |
| G06F 18/21 | (2023.01) | |

(52) U.S. Cl.
CPC ...... *G06F 16/9035* (2019.01); *G06F 16/9038* (2019.01); *G06F 18/214* (2023.01); *G06F 18/2185* (2023.01); *G06F 18/22* (2023.01); *G06N 3/04* (2013.01); *G06N 5/025* (2013.01)

(58) Field of Classification Search
CPC ............ G06F 16/9035; G06F 16/9038; G06K 9/6215; G06K 9/6256; G06K 9/6264; G06N 3/04; G06N 5/025
See application file for complete search history.

(56) References Cited

U.S. PATENT DOCUMENTS

| | | | |
|---|---|---|---|
| 2016/0140125 A1* | 5/2016 | Goyal | G06F 16/90324 707/751 |
| 2016/0342911 A1* | 11/2016 | Kannan | G06Q 10/0631 |
| 2018/0107744 A1* | 4/2018 | Klouche | H04L 69/16 |
| 2020/0110783 A1* | 4/2020 | Ushanov | G06N 20/00 |
| 2020/0210437 A1* | 7/2020 | Roitman | G06F 16/334 |
| 2020/0265116 A1* | 8/2020 | Chatterjee | G06F 18/2431 |
| 2020/0364520 A1* | 11/2020 | Brandes | G06K 9/6224 |

OTHER PUBLICATIONS

Abdollahpouri, H., et al. "Recommender Systems as Multistakeholder Environments." UMPA'17, Jul. 9-12, 2017, Bratislava, Slovakia, pp. 347-348.

Agrawal, R., et al. "Multi-Label Learning with Millions of Labels: Recommending Advertiser Bid Phrases for Web Pages." WWW"13, May 13-17, 2013, Rio de Janeiro, Brazil, pp. 13-23.

(Continued)

*Primary Examiner* — Angelica Ruiz
(74) *Attorney, Agent, or Firm* — Merchant & Gould P.C.

(57) ABSTRACT

Methods, systems and computer program products are provided for query understanding. A non-focused query quantifier generates non-focused query features that quantify a non-focused query and a non-focused query predictor generates a prediction associated with the non-focused query based on the non-focused query features.

21 Claims, 7 Drawing Sheets

(56) References Cited

OTHER PUBLICATIONS

Amami, R., et al. "Study of Phonemes Confusions in Hierarchical Automatic Phoneme Recognition System." Journal of Convergence Information Techology (JCIT), vol. 10, No. 4, Jul. 2015, pp. 13-20.
Anderson, A., et al. "Algorithmic Effects on the Diversity of Consumption on Spotify." WWW"20, Apr. 20-24, 2020, Taipei, Taiwan, 11 pages.
Armstrong, M. "Competition in two-sided markets." Rand Journal of Economics, vol. 37, No. 3, Autumn 2006, pp. 668-691.
Ashkan, A., et al. "Classifying and Characterizing Query Intent." Advances in Information Retrieval. ECIR 2009. Lecture Notes in Computer Science, vol. 5478. Springer, Berlin, Heidelberg. https://doi.org/10.1007/978-3-642-00958-7_53, pp. 578-586.
Zhou, Z. "A brief introduction to weakly supervised learning." National Science Review, 5:44-53, 2018, doi: 10.1093/nsr/nwx106.
Blanco, R., et al. "Fast and Space-Efficient Entity Linking in Queries." WSDM'15, Feb. 2-6, 2015, Shanghai, China, http://dx.doi.org/10.1145/2684822.2685317.
Yamada, I., et al. "Wikipedia2Vec: An Efficient Toolkit for Learning and Visualizing the Embeddings of Words and Entities from Wikipedia." Accessed at https://www.researchgate.net/publication/329734100_Wikipedia2Vec_An_Efficient_Toolkit_for_Learning_and_Visualizing_the_Embeddings_of_Words_and_Entities_from_Wikipedia, Jan. 2020.
Breiman, L. "Random Forests." Machine Learning, Kluwer Academic Publishers, 45, 5-21, 2001.
Wang, Z., et al. "Query Understanding though Knowledge-Based Conceptualization." IJCA (2015).
Chen, S., et al. "DocTag2Vec: An Embedding Based Multi-Label Learning Approach for Document Tagging." arXiv:1707.04596v1 [cs.CL] Jul. 15, 2017.
Croft, W.B., et al. "Query Representation and Understanding Workshop." ACM SIGIR Forum, vol. 44, No. 2, Dec. 2010, pp. 48-53.
Eisenmann, T., et al. "Strategies for Two-Sided Markets." Harvard Business Review, Oct. 2006.
Hashemi, H.B., et al. "Query Intent Detection using Convolution Neural Networks." WSDM QRUM 2016 Workshop, DOI: 10.1145/1235.
Hu, J., et al. "Understanding User's Query Intent with Wikipedia." WWW 2009, Apr. 20-24, 2009, Madrid, Spain, pp. 471-480.
Johnson, J. et al. "Billion-scale similarity search with GPUs." arXiv:1702.08734v1 [cs]CV] Feb. 28, 2017.
Evenshtein, V.I. "Binary Codes Capable of Correcting Deletions, Insertions, and Reversals." Soviety Physics-Doklady, vol. 10, No. 8, Feb. 1966, p. 707-710.
Li, A., et al. "Search Mindset, Understanding Focused and Non-Focused Information Seeking in Music Search." WWW"19 May 13-17, 2019, San Francisco, CA, pp. 2971-2977.
Bertin, M. "An Economic Policy Perspective on Online Platforms." Econstor, Institute for Prospective Technological Studies Digital Economy Working Paper, No. 2016/05, European Commission, Joint Research Centre (JRC), Seville (2016).
Mehrotra, R., et al. "Jointly Leveraging Intent and Interaction Signals to Predict User Satisfaction with Slate Recommendations." WWW'19, May 13-17, 2019, San Francisco, CA.
Mehrotra, R., et al. "Towards a Fair Marketplace: Counterfactual Evaluation of the trade-off between Relevance, Fairness & Satisfaction in Recommendation Systems." CIKM'18, Oct. 22-26, 2018, Torino, Italy.
Milolov, T., et al. "Efficient Estimation of Word Representation in Vector Space." arXiv:1301.3781v3 [cs.CL] 7 Sep. 2013.
Milde, B., et al. "Multitask Sequence-to-Sequence Models for Grapheme-to-Phoneme Conversion." Interspeech 2017, Aug. 20-24, 2017, Stockholm, Sweden, pp. 2536-2540.
Pappu, A., et al. "Lightweight Multilingual Entity Extraction and Linking." WSDM 2017, Feb. 6-10, 2017, Cambridge, United Kingdom.
Prabhu, Y., et al. "Parabel: Partitioned Label Trees for Extreme Classification with Application to Dynamic Search Advertising." WWW'2018, Apr. 23-27, 2018, Lyon, France.
Rao, J., et al. "Multi-Task Learning with Neural Networks for Voice Query Understanding on an Entertainment Platform." KDD 2018, Aug. 19-23, 2018, London, United Kingdom.
Rysman, M. "The Economics of Two-Sided Markets." Journal of Economic Perspectives, vol. 23, No. 3, Summer 2009, pp. 125-143.
Sriram, S., et al. "Platforms: A Multiplicity of Research Opportunities." University of Michigan, Ross School of Business Working Paper, Working Paper No. 1271, May 2014.
Wang, X., et al. "Mining Broad Latent Query Aspects from Search Sessions." KDD (2009), pp. 867-875.
Wang, Y., et al. "Query Ambiguity Revisited: Clickthrough Measures for Distinguishing Informational and Ambiguous Queries." Human Language Technologies: The 2010 Annual Conference of the North American Chapter of the ACL, Los Angeles, CA, Jun. 2010, pp. 361-364.
Wang, Y., et al. "Semi-Supervised Learning of Semantic Classes for Query Understanding—the Web and for the Web." CIKM'09 Nov. 2-6, 2009.

* cited by examiner

QUERY UNDERSTANDING METHODS AND SYSTEMS

TECHNICAL FIELD

Example aspects described herein relate generally to search engines, and more particularly to systems, methods and computer program products for quantifying non-focused queries to facilitate exposure of under-served content.

BACKGROUND

Platform ecosystems have witnessed an explosive growth by facilitating interactions between consumers and suppliers. Search systems powering such platforms play an important role in surfacing content in front of users. To maintain a healthy, sustainable platform, systems designers often need to explicitly consider exposing under-served content to users, content which might otherwise remain undiscovered. It has been realized that there is a need to timely surface under-served content in search results. Lacking, however, is a specialized system that identifies potential non-focused search queries on a platform, such as a media content streaming platform, where users' information needs are non-specific enough to expose under-served content.

One technical problem in exposing under-served content involves understanding queries. An intuitive approach to understanding queries could be to check existing results associated with the queries to determine for which queries the users are consuming under-served content. However, such content is by definition surfaced very rarely, hence a simple inspection of results for existing queries has been found to be largely ineffective. This presents a major technical challenge, as the direct inspection of queries and results shown and consumed by the user is non-informative for the majority of the queries.

Some technical solutions to this problem involve understanding query semantics and knowledge-based conceptualization, along with semi-supervised and neural learning, and query intent modeling. One such solution particularly addresses this as multi-label learning problem where the words within a query are treated as labels that are used to annotate the relevant results.

None of the aforementioned technical solutions focus on quantifying broadness of query aspects and intent while leveraging such query aspects to specifically consider how some queries are better suited than others to cause under-served content to be surfaced.

SUMMARY

The example embodiments described herein meet the above-identified needs by providing methods, systems and computer program products for query understanding.

In one embodiment, a query understanding system is provided. The query understanding system comprises a non-focused query quantifier 200 configured to generate non-focused query features that quantify a non-focused query; and a non-focused query predictor 210 configured to generate a prediction associated with the non-focused query based on the non-focused query features. In some embodiments, the non-focused query quantifier 200 further comprises: a standalone feature analyzer 202 configured to generate standalone features based on the non-focused query features; a reference dependent feature analyzer 204 configured to generate reference dependent features based on the non-focused query features; and an interaction feature analyzer 206 configured to generate interaction features based on the non-focused query features.

In some embodiments, the non-focused query predictor 210 further comprises a feature threshold predictor 212 configured to apply a set of threshold-based rules on the non-focused query features to generate a prediction of how likely the non-focused query will include under-served content. In some embodiments, the feature threshold predictor 212 is configured to analyze threshold-based predictors by, for each non-focused query feature: compute the prediction of under-served content based on an evolving threshold; and test pairwise combinations between the non-focused query features based on a pair of non-focused query features and thresholds using a logical AND operation between two non-focused query features, correspondingly.

In some embodiments, the non-focused query predictor 210 further comprises a training model predictor 214 configured to estimate labels of the non-focused query. In some embodiments, the training model predictor 214 is further configured to: estimate a plurality of output labels of a query using a random forest classifier; flag at least one of the labels as a weak supervision label; and use a probability of a label assignment as a sample weight for training a neural network.

In some embodiments, the non-focused query predictor 210 further comprises an ensemble predictor 216 configured to apply an ensemble model to predict patterns based on classifiers associated with (i) the standalone features, (ii) the reference dependent features, (iii) the interaction based features, or (iv) any combination of (i), (ii), or (iii). In some embodiments, the ensemble predictor 216 is further configured to: apply the ensemble model based on the predictions of a threshold-based classifier and a neural network classifier; and communicate an indication to present under-served content to the user when the threshold-based classifier or the neural network classifier predicts a query to be a non-focused query.

In some embodiments, the reference queries are queries that result in under-served content consumed by users. In some embodiments, the standalone features include (i) a number of under-served content consumed by users for the non-focused query, (ii) a number of under-served content displayed for the non-focused query, or (iii) both (i) and (ii); the reference dependent features include: (i) an overlap in clicked results, (ii) an overlap in displayed results, (iii) an embedding distance; (iv) a knowledge graph (KG) distance, or (v) any combination of (i), (ii), (iii) and (iv); and the interaction features include a click entropy.

In some embodiments, there is provided a method for query understanding, comprising the steps of: generating a plurality of non-focused query features that quantify a non-focused query; and generating a prediction associated with the non-focused query based on the non-focused query features.

In some embodiments, the method for query understanding further comprises the steps of: generating standalone features based on the non-focused query features; generating reference dependent features based on the non-focused query features; and generating interaction features based on the non-focused query features.

In some embodiments, the method for query understanding further comprising the steps of: applying a set of threshold-based rules on the non-focused query features to generate a prediction of how likely the non-focused query will include under-served content. In some embodiments, the method for query understanding further comprising the steps of: for each non-focused query feature: computing the prediction of under-served content based on an evolving threshold; and testing pairwise combinations between the non-focused query features based on a pair of non-focused query features and thresholds using a logical AND operation between two non-focused query features, correspondingly.

In some embodiments, the method for query understanding further comprises the step of estimating labels of the non-focused query. In some embodiments, the method for query understanding further comprises the steps of: estimating a plurality of output labels of a query using a random forest classifier; flagging at least one of the labels as a weak supervision label; and using a probability of a label assignment as a sample weight for training a neural network.

In some embodiments, the method for query understanding further comprises the step of: applying an ensemble model to predict patterns based on classifiers associated with (i) the standalone features, (ii) the reference dependent features, (iii) the interaction-based features, or (iv) any combination of (i), (ii), or (iii). In some embodiments, the method for query understanding further comprises the steps of: applying the ensemble model based on the predictions of a threshold-based classifier and a neural network classifier; and communicating an indication to present under-served content to the user when the threshold-based classifier or the neural network classifier predicts a query to be a non-focused query.

In some embodiments, the reference queries are queries that result in under-served content consumed by users. In some embodiments, the standalone features include (i) a number of under-served content consumed by users for the non-focused query, (ii) a number of under-served content displayed for the non-focused query, or (iii) both (i) and (ii); the reference dependent features include: (i) an overlap in clicked results, (ii) an overlap in displayed results, (iii) an embedding distance; (iv) a knowledge graph (KG) distance, or (v) any combination of (i), (ii), (iii) and (iv); and the interaction features include a click entropy.

In some embodiments, there is provided a non-transitory computer-readable medium having stored thereon one or more sequences of instructions for causing one or more processors to perform the methods described herein.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

Figure 1:
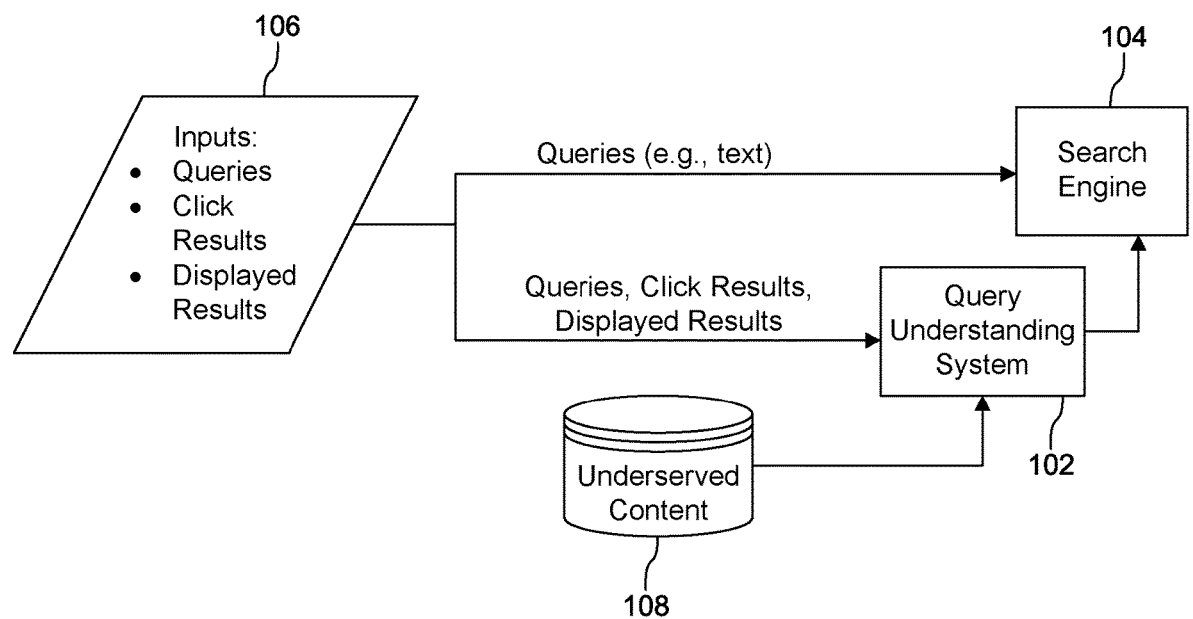
FIG. 1 illustrates an example query understanding system which provides to a search engine predictions (e.g., in the form of probabilities) associated with a search query according to an example embodiment of the present invention.

The example embodiments of the invention presented herein are directed to methods, systems and computer program products for quantifying non-focused queries to facilitate exposure of under-served content, which are now described herein in terms of an example query understanding system for use in a media content delivery platform. This description is not intended to limit the application of the example embodiments presented herein. In fact, after reading the following description, it will be apparent to one skilled in the relevant art(s) how to implement the following example embodiments in alternative embodiments such as involving any platform that contains under-served items, articles, or goods (individually and collectively referred to herein as real asset(s)).

Generally, aspects of the present invention compute predictions (also referred to sometimes as "scores") for each search query, even if the query does not contain under-served content among its results. In some embodiments, the predictions are in the form of probabilities. For example, the predictions for each query can be a single number that is the likelihood of the query to include additional under-served content. This number is a probability (e.g., between 0 and 1). As noted above, such a probability can also be referred to as a score.

To do so, a set of so-called "reference queries" are first considered. Reference queries are queries that include under-served content where users are consuming such content. For such queries so called "standalone features", "reference dependent features" and "interaction-based features" are computed. Standalone features include a number of under-served content consumed by users for the query and/or a number of under-served content displayed for the query.

For each non-reference query, reference dependent features are computed. Reference dependent features include an overlap in clicked results, an overlap in displayed results, an embedding distance, a pronunciation distance, and a knowledge graph (KG) distance. Overlap in click results are how many results the users are consuming from non-reference queries that are also consumed from reference queries. Overlap in displayed results are how many results are included in non-reference queries that also appear in reference queries.

Embedding distance is the embedding of a query based on the average embedding of the results that users consume for the query. The embedding distance is defined in terms of embeddings of the target entities (artist, track, album, playlists, e.g., results that users click on for the particular query), with respect to under-served content. In an example implementation discussed in more detail below, the embedding distance is computed using FAISS, a fast approximate nearest neighbor algorithm.

Pronunciation distance is a weighted pronunciation distance between the reference queries and rest of the queries. In some embodiments, the pronunciation distance metric is a customized Levenshtein distance that overlooks the orthographic differences to capture the similarity between the query texts.

Knowledge graph (KG) distance indicates queries that often share similar results tend to share ontological roots. To capture this, in some embodiments, queries are linked to entities on Wikipedia Knowledge Graph (KG) using an entity linking toolkit. Doing so the partial queries are mapped to canonical KG entities. In turn, the distance between the embeddings of KG entities (corresponding to their respective queries) using a pre-trained embeddings model, such as Wikipedia2Vec.

Interaction features can include click entropy. Click entropy indicates whether a query is highly non-focused or not. As this value is not analytically computable, it is estimated by counting the number of times that users clicked on a particular result based on the same query. Examples of queries that include under-served content and have high entropy are wedding, instrumental, sad, morning.

The above-described features carry information on which non-focused queries are better suited to return under-served content. Based on these, machine learning models are trained to predict whether an unlabeled query could help presenting under-served content in the search results. Two manual thresholding-based predictors and three machine learning models using the proposed features are used, referred to herein as feature thresholding, combination thresholding, and trained models.

Feature Thresholding. For each feature described above, a predictor is used to predict the output based on an evolving threshold. For threshold $\rho_s$ and a feature s, examples having a feature under examination are regarded as higher than the threshold as positive, and those with the feature lower than the threshold as negative.

Combination Thresholding. The features are then combined using pairwise AND combinations, and tested a threshold-based predictor as before.

Trained Models. To overcome the limitations of threshold-based predictors, one or more of the following machine learning models can be used to predict the suitability of a query to include under-served content:
1. decision tree classifier
2. random forest classifier
3. neural network classifier
4. neural network with weak supervision
5. ensemble models with neural network and single feature thresholding predictors FIG. 1 illustrates an example query understanding system 102 which provides to a search engine 104 probabilities associated with a search query according to an example embodiment of the present invention. Inputs 106 including queries, click results, and display results are collected obtained by now known or future developed mechanisms. Search engine 104 receives queries (e.g., in text format or voice) through its interface and query understanding system 102 receives queries, click results, and display results through its interface. A database of under-served content 108 is communicatively coupled to query understanding system 102. A "non-focused query" as used herein is a query which, when processed by a ranking algorithm of a search engine, could return under-served content to a user while satisfying their search needs. Query understanding system 102 detects non-focused queries. As explained above, an intuitive approach could be to check existing results associated with queries by determining for which queries the users are consuming under-served content. However, such content is by definition surfaced very rarely, hence a simple inspection of the results for existing queries is largely ineffective. This presents a major technical challenge, as the direct inspection of queries and results shown and consumed by a user is non-informative for the majority of the queries. To overcome the limitation, one technical solution is to collect standalone features, reference dependent features and interaction features. "Standalone features" are features that include surface-level information from the queries alone. "Reference dependent features" are features that are conditioned on gold standard (reference) queries that already included under-served music content in their results, and consumed by users. "Interaction features" are features that quantify the generality of a query.

As used herein, "$Q_i$" indicates a query under analysis, and "$Q^r$" indicates a reference query. A reference query $Q^r$ is a query for which users already are consuming under-served content. "R" refers to the results associated to queries $Q_i$. "$R^c$" indicate results users click on. "$R^d$" indicates results displayed (but not necessarily consumed). "C" indicates the under-served content available on a platform containing a search engine (not necessarily included in any query result). It should be understood that symbols such as $Q_i$ and $Q^r$ sometimes refer to one or more particular query or reference query.

Figure 2:
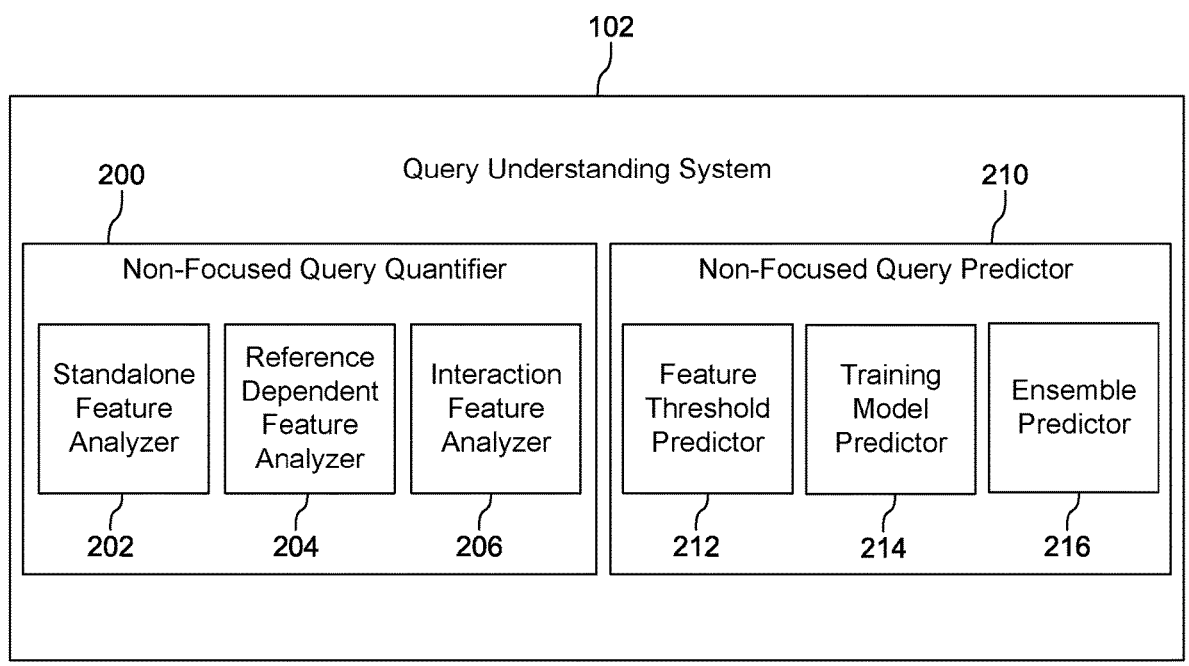
FIG. 2 illustrates a query understanding system according to an embodiment of the present invention.

FIG. 2 illustrates a query understanding system 102 according to an embodiment of the present invention. Query understanding system 102 includes a non-focused query quantifier 200 configured to generate features that quantify non-focused queries. In some embodiments, non-focused query quantifier 200 includes a standalone feature analyzer 202 configured to provide standalone feature analysis and generate standalone features, a reference dependent feature analyzer 204 configured to perform reference dependent feature analysis and generate reference dependent features, and an interaction feature analyzer 206 configured to perform interaction based feature analysis and generate interaction features. Query understanding system also includes a non-focused query predictor 210 configured to generate predictions associated with non-focused queries. In some embodiments, non-focused query predictor 210 includes a feature threshold predictor 212 configured to analyze threshold-based predictors, a training model predictor 214 configured to estimate labels of queries $Q_i$, and an ensemble predictor 216 configured to apply an ensemble model to predict patterns based on classifiers.

Standalone Feature Analyzer

Figure 3:
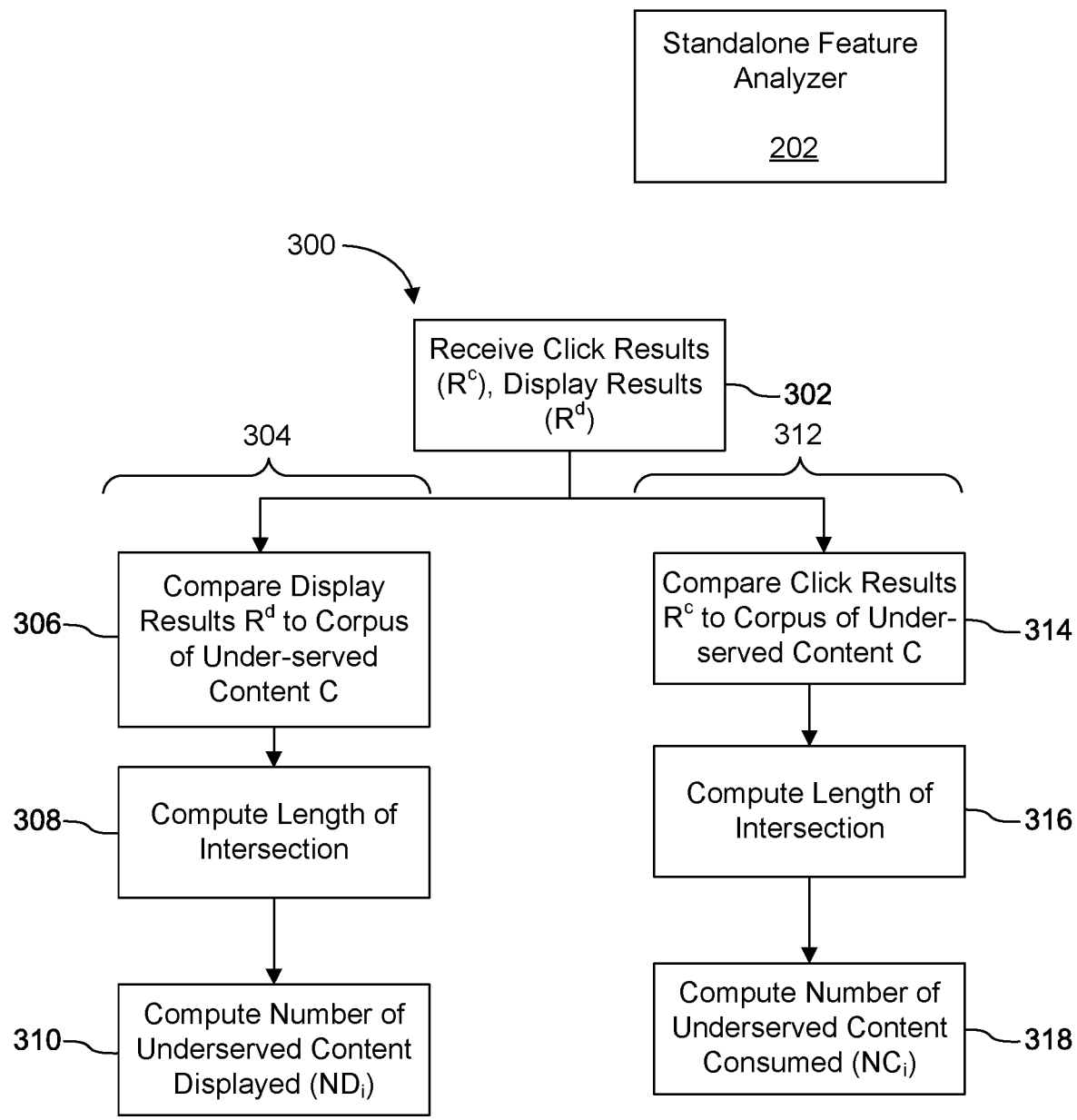
FIG. 3 illustrates a standalone feature analyzer and a process it performs to provide standalone feature analysis according to an embodiment of the present invention.

FIG. 3 illustrates a standalone feature analyzer 202 and a process for providing standalone feature analysis 300 that standalone feature analyzer 202 performs according to an embodiment of the present invention.

At step 302, standalone feature analyzer 202 receives click results $R^c$ and display results $R^d$.

Standalone feature analyzer 202 executes steps 304 to generate a number of under-served content displayed, $ND_i$. Standalone feature analyzer 202 executes steps 312 to generate a number of under-served content consumed, $NC_i$.

In step 306 the display results $R^d$ for a particular query are compared to a corpus of under-served content C (e.g., stored in under-served content database 108). The length of intersection of the display results $R^d$ and the corpus of under-served content C is computed based on the comparison, as shown in step 308.

In step 310, standalone feature analyzer 202 computes the number of under-served content items displayed to users, $ND_i$, by computing the intersection of the display results $R^d$ and the under-served content C. In an example implementation, the number of under-served content displayed for a query $Q_i$, indicated as $ND_i$, is computed according to equation 1, as follows:

$$ND_i = |R_i^d \cap C| \qquad (1)$$

In step 314, the number of under-served content consumed $R^c$ (interchangeably referred to as "click results") for a particular query are compared to the corpus of under-served content C. The length of intersection of the under-served content consumed $R^c$ and the corpus of under-served content C is computed based on the comparison, as shown in step 316. In step 318, standalone feature analyzer 202 computes a number of under-served content consumed, $NC_i$, by computing the intersection of the under-served content consumed $R^c$ and the under-served content C. In an example implementation, the number of under-served content consumed $R^c$ by the users for a query $Q_i$, indicated as $NC_i$, is computed according to equation 2, as follows:

$$NC_i = |R_i^c \cap C| \quad (2)$$

In an embodiment, standalone feature analyzer 202 serves a query through a prefix query resolution mechanism. In so doing, the query text is an abridged version of the actual user intent. Consequently, the query text itself has little context for feature extraction. To address this, an assumption is made that the clicked results $R^c$, e.g., in the context of a media content delivery system the track titles, album or artist names, are latent representations of the intent of the user.

In some embodiments, standalone feature analyzer 202 computes an embedding vector of a query $Q_i$ as weighted average of vectors (e.g., Word2Vec vectors) corresponding to the clicked results. In an example implementation, the vector representation of a track is computed based on its co-occurrence statistics across playlists and the vector representation of an artist associated with the track is the weighted average of the tracks they have performed.

Reference Dependent Feature Analyzer

Figure 4:
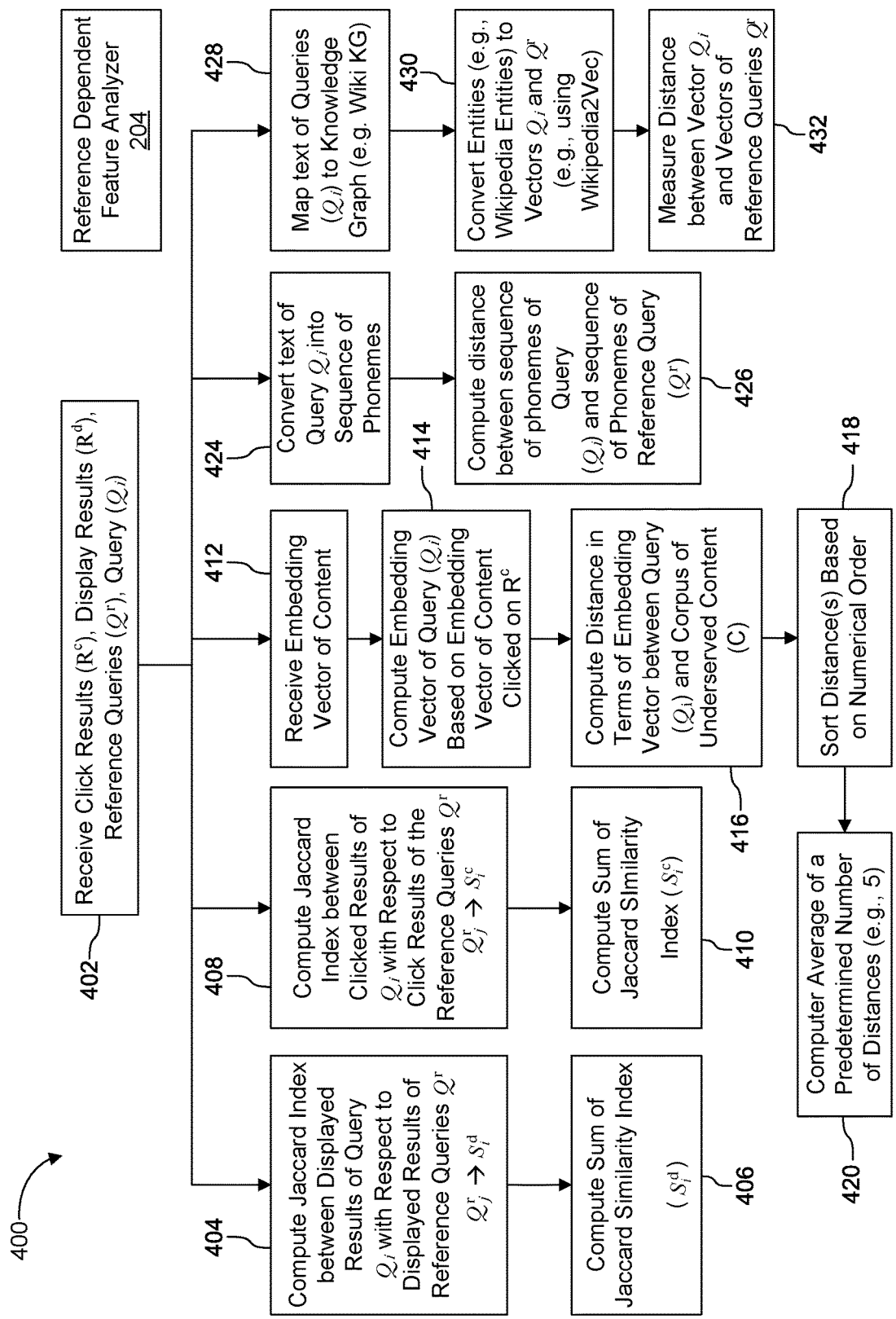
FIG. 4 illustrates a reference dependent feature analyzer and a process it performs to provide reference dependent feature analysis according to an embodiment of the present invention.

FIG. 4 illustrates a reference dependent feature analyzer 204 and a process for providing reference dependent feature analysis 400 that reference dependent feature analyzer 204 performs according to an embodiment of the present invention. In step 402 reference dependent feature analyzer 204 receives click results $R^c$, display results $R^d$, reference queries $Q^r$, and a queries $Q_i$. In an example implementation query $Q_i$ is in text form.

It may be the case that relatively very few queries are labeled as reference queries $Q^r$, meaning these queries provide results that include under-served content consumed by users. In an example embodiment, results returned for these reference queries $Q^r$ can be compared against results returned for all other queries. A higher overlap among a pair of results means that a particular query $Q_i$ is highly similar to a query belonging to a reference query $Q^r$.

Reference dependent feature analyzer 204 is configured to compute two similarities: overlap in clicked results ($S^c$), and overlap in displayed results ($S^d$). Both the overlap in clicked results $S^c$ and the overlap in displayed results $S^d$ are computed in terms of the number of entities overlapping (e.g., intersecting) divided by the size of their union, e.g., the Jaccard similarity between displayed results or consumed results.

At step 404 reference dependent feature analyzer 204 computes, for any query $Q_i$, the Jaccard index between displayed results of query $Q_i$, indicated as $R_i^d$ below, with respect to the displayed results of the reference queries $Q_j^r$ and at step 406 computes the sum of the Jaccard similarity index $S_i^d$ according to equation 3, as follows:

$$S_i^d = \Sigma_{j=1}^{|Q^r|}(J(R_i^d, Q_j^r)) \quad (3)$$

At step 408, reference dependent feature analyzer 204 computes, for any query $Q_i$, the Jaccard index between the clicked results of query $Q_i$, indicated as $\overline{R_i^c}$ below, with respect to the clicked results of the reference queries $Q_j^r$ and in step 410 reference dependent feature analyzer 204 computes the sum of the Jaccard similarity index $S_i^c$ according to equation 4, as follows:

$$S_i^c = \Sigma_{j=1}^{|Q^r|}(J(R_i^c, Q_j^r)), \quad (4)$$

where J is the Jaccard similarity.

Embedding Distance. Given a wide range of results available for the same query, the Jaccard similarity is 0 in most cases. To remedy this and to avoid scalability problems when the clicked results of the reference queries $Q^r$ is large, reference dependent feature analyzer 204 also determines in steps 412, 414, 416, 418 and 420 a non-exact matching additional metric, which is the distance d(Q,C) defined in terms of embeddings of the target entities. In an example embodiment the embeddings of the target entities are the click results $R^c$ (artist, track, album, playlists, e.g., results that users click on for the particular query) with respect to under-served content C. In an example embodiment, in step 412 reference dependent feature analyzer 204 receives an embedding vector of content. In turn, reference dependent feature analyzer 204 computes an embedding vector of a query $Q_i$ based on the embedding vector of the click results $R^c$ as shown in step 414. In step 416, reference dependent feature analyzer 204 computes a distance in terms of the embedding vector between the query $Q_i$ and the corpus of under-served content (C). The distance d(Q,C) is computed according to equation 5 as follows:

$$d(Q,C) = f(d_1, \ldots, d_{|C|}), \quad (5)$$

where f computes the average of a predetermined number, e.g. five (5), of its smallest inputs. At step 418, the distances for a predetermined number of inputs are sorted based on a numerical order. In turn, at step 420 the average of the predetermined number of distances (e.g., 5), $d_i(Q,C_i)$, is computed according to equation 6, as follows:

$$d_i(Q,C_i) = L2\_distance(avg(R^c), C_i) \quad (6)$$

In an example implementation, the distance is computed using FAISS, a fast approximate nearest neighbor algorithm. Advantageously, the distance is useful when there is currently no under-served content displayed. Queries that exhibit a low d(Q,C) while not including any of such content include, for example, study music, peace, and sleep stories.

Pronunciation distance. Reference dependent feature analyzer 204 is also configured to determine a pronunciation distance metric. This metric measures the weighted pronunciation distance between the reference queries $Q^r$ and rest of the queries Q. In an example implementation, the pronunciation distance metric is a customized Levenshtein distance that overlooks the orthographic differences to capture the similarity between the query texts. To accomplish this, reference dependent feature analyzer 204 receives a query $Q_i$ as shown in step 402 and at step 424 converts the query $Q_i$ into sequence of phonemes by, e.g., applying a Grapheme-to-Phoneme (G2P) model trained on a recurrent neural network (RNN) with long short-term memory units (LSTM) architecture. Since queries tend to be very noisy, in some embodiments, reference dependent feature analyzer 204 is configured to ignore commonly confused pairs of phonemes (e.g., {D, DH, T, TH}. Reference dependent feature analyzer 204 particularly can accomplish this by using a predetermined edit cost that is set relatively lower (than (1)) for commonly confused pairs and compute the distance. Otherwise the edit costs can be set to one (1). The lower edit costs are derived from the statistics obtained by analyzing the impact of phoneme confusions on the recognition rates according to now known or future developed techniques.

Reference dependent feature analyzer 204 also computes the distance between a sequence of phonemes of a query $Q_i$ and a sequence of phonemes of a reference query $Q^r$, as shown in step 426. An advantage of pronunciation distance over the lexical edit distance is the ability to detect common misspellings, word elongations, or incomplete strings of a reference query.

TABLE 1 below illustrates that the pronunciation distance is 0 for the pair of incorrect and correct query ("Randy Rhoads" pronounced as "RAE N D IY R OW D Z") which means they are highly similar, whereas the lexical distances are non-zero values.

TABLE 1

| Wrong spellings | Lexical distance | Phonetic spelling | pronunciation distance |
|---|---|---|---|
| Randy Roads | 1 | R AE N D IY R OW D Z | 0 |
| Rhandy Rohads | 3 | R AE N D IY R OW D Z | 0 |
| Rhaandhy Rhoadzzz | 6 | R AE N D IY R OW D Z | 0 |

Knowledge Graph Distance. Queries that often share similar results tend to share ontological roots. In some embodiments, reference dependent feature analyzer 204 is configured to capture queries that share similar results by linking the queries to entities on a knowledge graph (KG), such as the Wikipedia Knowledge Graph. This is accomplished by, for example, using an entity linking toolkit, such as Fast Entity Linker. In an example embodiment, at step 428 reference dependent feature analyzer 400 maps the queries $Q_i$ to canonical KG entities. In an example implementation, at step 430 the KG entities are converted to vectors $Q_i$ and $Q^r$. In turn, at step 432 reference dependent feature analyzer 204 measures a distance between the embeddings of KG entities (corresponding to their respective queries) using a pre-trained embeddings model. Query text mapped to their respective KG entities could disambiguate queries that are lexically similar but refer to different entities and are distant in the embedding space. TABLE 2 below illustrates example queries with a common phrase "small town" but referring to different KG entities:

TABLE 2

| Query text | Wikipedia KG entity |
|---|---|
| small town usa | Small_Town_USA |
| small town girl | Small_Town_Girl_(song) |
| break up in a small town | Break_Up_in_a_Small_Town |
| small town saturday night | Small_Town_Saturday_Night_(song) |

Interaction Feature Analyzer

Figure 5:
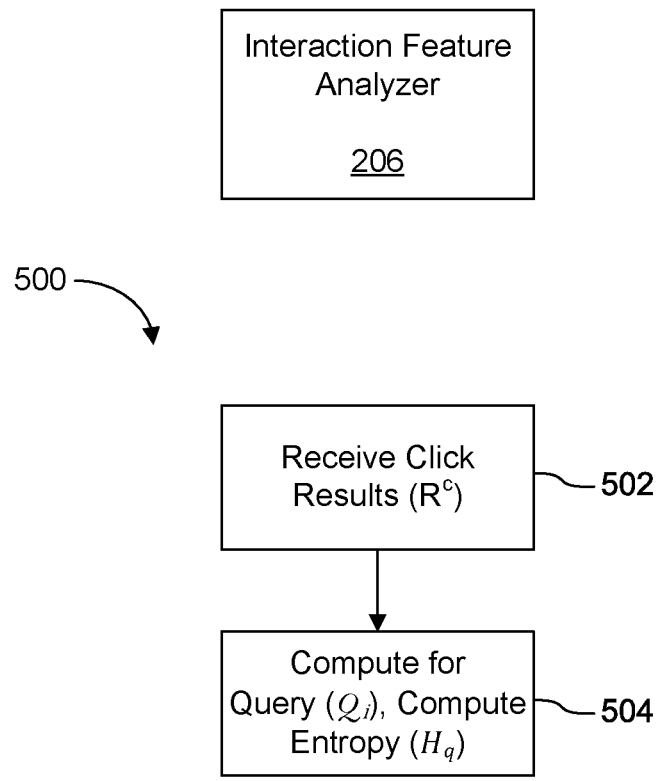
FIG. 5 illustrates an interaction feature analyzer and a process it performs to provide interaction feature analysis according to an embodiment of the present invention.

FIG. 5 illustrates an interaction feature analyzer 206 and a process for providing interaction-based feature analysis 500 that interaction feature analyzer 206 performs according to an embodiment of the present invention.

Click Entropy. Click entropy indicates whether a query $Q_i$ is highly non-focused or not. In step 502, the interaction feature analyzer 206 receives click results $R^c$. In step 504, for a query $Q_i$, interaction feature analyzer 206 computes entropy $H_q$ according to equation 7, as follows:

$$H_q = -\Sigma_k(p(R_{q,k}{}^c) * \log(p(R_{q,k}{}^c))), \quad (7)$$

where $p(R_{q,k}{}^c)$ is the probability of the result $R_{q,k}{}^c$ to be consumed by the users. In an example embodiment, interaction feature analyzer 206 computes entropy $H_q$ by counting the number of times that users clicked on a particular result based on the same query. Entropy indicates broad intent understanding. Simultaneously, there is a strong correlation between an unfocused query and receptiveness of a user to explore novel content. Examples of queries that include under-served content and have high entropy include wedding, instrumental, sad, morning.

Non-Focused Query Predictor

Figure 6:
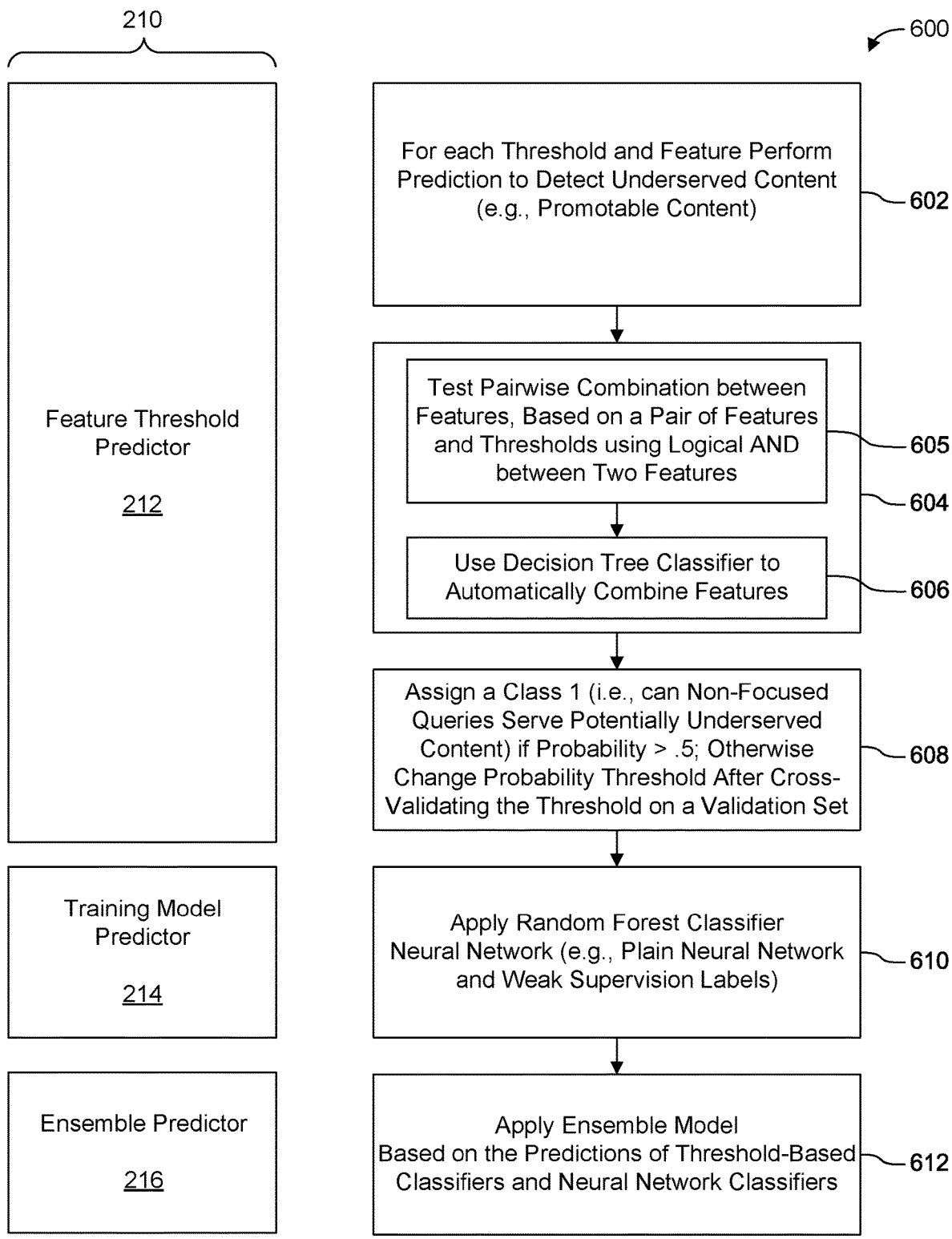
FIG. 6 illustrates a non-focused query predictor and a process it performs to provide non-focused query predictions according to an embodiment of the present invention.

The features obtained from the above non-focused query quantifier 200, namely standalone features, reference dependent features and interaction features, carry information on which non-focused queries are better suited to return under-served content. FIG. 6 illustrates a non-focused query predictor 210 and a process for providing non-focused query predictions 600 that non-focused query predictor 210 performs according to an embodiment of the present invention. As shown in FIG. 6, non-focused query predictor 210 includes a feature threshold predictor 212, a training model predictor 214 and an ensemble predictor 216. In an example embodiment, based on these features, non-focused query predictor 210 learns a model to predict whether an unlabeled query can help present under-served content in the search results.

Feature Threshold Predictor

In some embodiments, feature threshold predictor 212 is configured to analyze threshold-based predictors and computes a prediction. The output of the feature threshold predictor 212 is a prediction as to whether a query is suitable to include more under-served content. In step 602 of FIG. 6, for each threshold and feature under analysis, feature threshold predictor 212 detects under-served content. In an example implementation, for each feature under analysis, feature threshold predictor 212 generates the prediction based on a threshold $\rho_s$. In some embodiments, the threshold evolves over time. For threshold $\rho_s$ and a feature s, the examples having a feature under examination that are higher than the threshold $\rho_s$ are regarded as positive, and those examples having a feature that is lower than the threshold $\rho_s$ is regarded as negative. Non-focused query predictor 210 computes a prediction $y_{ts}$ according to equation 8, as follows:

$$1 \Longleftrightarrow s \geq \rho_s \quad (8)$$

$y_{ts}=0$ otherwise, where s is a non-distance-based feature. For distance-based features non-focused query predictor 210 reverses the prediction, as shown in equation 9:

$$y_{ts}=1 \Longleftrightarrow s \geq \rho_s \quad (9)$$

$y_{ts}=0$ otherwise, because of the negative correlation of distance-based features with the output to predict. $\rho_s$ is a feature specific threshold that has been cross-validated on a learning set $X_{lr}$ after multiple splits in training and validation (e.g., 10-fold cross-validation).

As explained above, in step 602, for each threshold and feature, feature threshold predictor 212 performs a feature threshold prediction procedure to detect the suitability for a query to include under-served content. In step 604 combination thresholding is performed based on standalone features, reference dependent features and interaction-based features. In an example implementation, combination thresholding is performed as follows: in step 605, the feature threshold predictor 212 tests pairwise combinations between the non-focused query features based on a pair of non-focused query features and thresholds using a logical AND operation between two non-focused query features, correspondingly; and in step 606, a decision tree classifier is used to automatically combine features to identify which queries could potentially include under-served content.

In an example implementation, a pairwise combination between the features is tested, based on a pair of features and thresholds using the logical AND operation between two features, according to equation 10 below:

$$y_{ts}=1 \Longleftrightarrow s_1<\rho_1 \text{ AND } s_2<\rho_2, \quad (10)$$

$y_{ts}=0$ otherwise. As noted above, when $s_1$ or $s_2$ are distance-based features, $s_1>\rho_1$ and/or $s_2>\rho_2$.

To avoid trying an exponential number of combinations of features, an automated procedure is used to find the best multiple combination of features. As described above, in step 606 a decision tree classifier is used to automatically combine features to identify which queries could potentially include under-served content. In some embodiments, the decision tree classifier builds a "decision tree", meaning that starting from the most discriminative feature, it employs a set of threshold-based rules on the features to arrive at the best prediction. As this procedure is prone to overfitting, a grid search cross-validation procedure is executed by feature threshold predictor 212. In some embodiments, the grid search cross-validation procedure is limited to height tree structure of, e.g., 5, to find the best decision tree. Not only decision trees provide an automated way to infer the best thresholds, they also enable relatively interpretation of the results through their inspection.

Each sample is associated with a probability of belonging to one class. Based on this, in step 608 the class label is assigned to the sample. In one example implementation, feature threshold predictor 212 assigns a class to one (1) if the probability of the label is higher than 0.5. This means that the non-focused queries can serve potentially under-served content. Otherwise the probability threshold is changed after cross-validating the threshold on the validation set.

Training Model Predictor

Generally, query labeling has a high cost. The majority of queries may be unlabeled. To address this, in some embodiments, labeled queries are used to improve the predictive power of the models. To accomplish this, weak supervision techniques with inaccurate labeling are employed. To assign a weak supervision label to unlabeled queries, several approaches can be used.

In some embodiments, a model is trained based on the standalone features, the reference dependent features and/or the interaction-based features. In an example implementation, training model predictor 214 executes a random forest classifier, as shown in step 610. Particularly, the output labels of all queries $Q_i$ are estimated using the random forest classifier and such labels are flagged as weak supervision labels. Next, all queries with the weak supervision label are used, but using a probability of label assignment as a sample weight during the training procedure of the neural network.

Ensemble Predictor

Each classifier has its own strength and weakness. To benefit from all of the different classifiers, in some embodiments, an ensemble predictor 216 applies a model to predict patterns according to the classifiers. In an example implementation, the ensemble predictor 216 applies an ensemble model based on the predictions of the best performing classifiers, namely the threshold-based (e.g., using Entropy, Pronunciation distance, Min Dist Content, Dist Reference Queries) and the neural network classifier, as shown in block 612. The ensemble model operates as a voting mechanism with three different voting criteria as follows:

$$En(q) = \begin{cases} 0 & \text{If at least one classifier identifies non-focused query;} \\ 1 & \text{If at least two classifiers agree;} \\ 2 & \text{If at least three classifiers agree.} \end{cases} \quad (11)$$

The above voting criteria aims at higher recall that if any of the classifiers have predicted a query to be non-focused, then there exists the potential to present under-served content to the user.

The example embodiments of the invention (i.e., system 102 or any part(s) or function(s) thereof) may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

Figure 7:
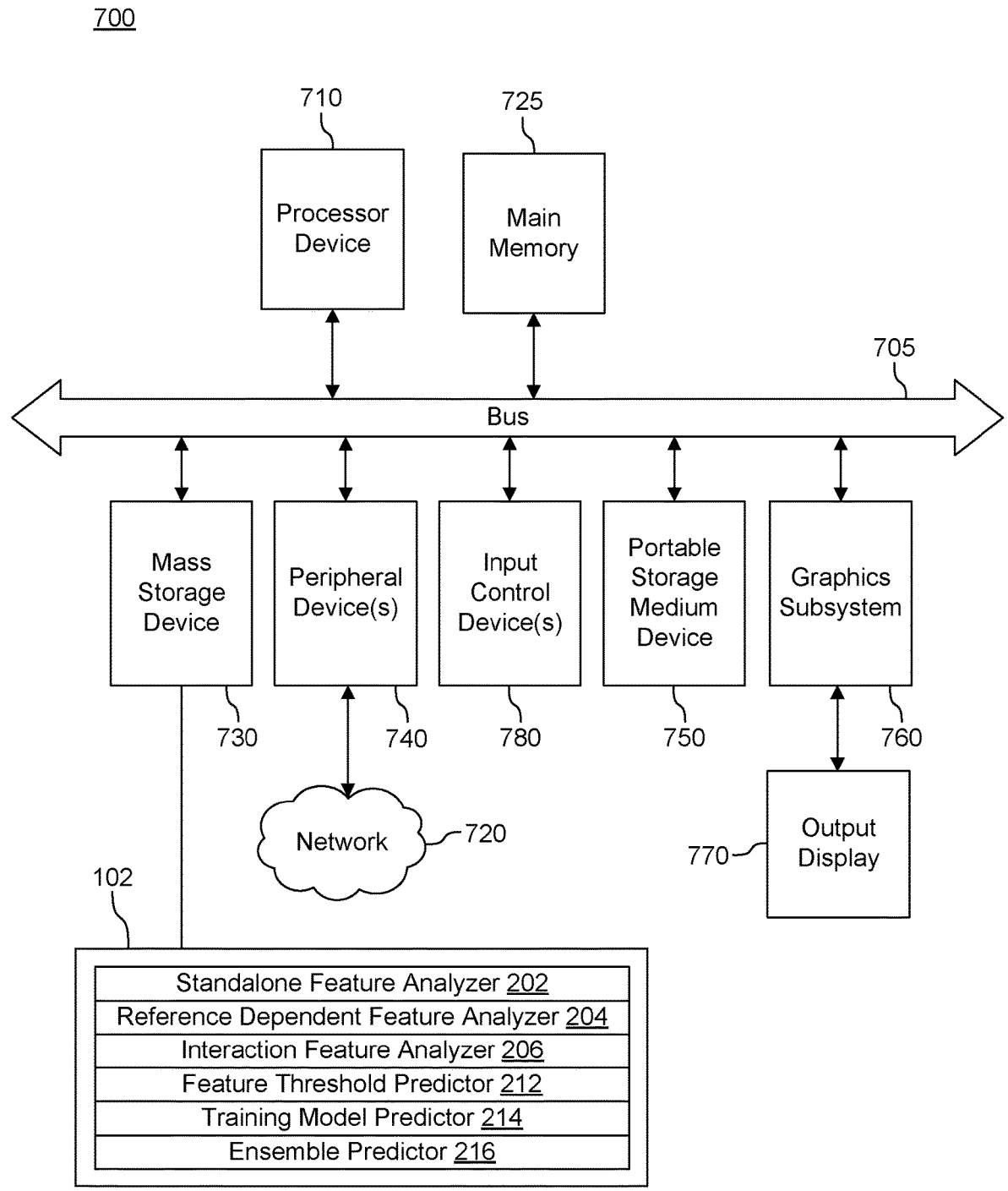
FIG. 7 is a block diagram for explaining a system for query understanding according to the example embodiments described herein.

FIG. 7 is a block diagram for explaining of a system 700 for query understanding, in accordance with some of the example embodiments described herein.

The system 700 includes a processor device 710, a main memory 725, and an interconnect bus 705. The processor device 710 may include without limitation a single microprocessor, or may include a plurality of microprocessors for configuring the system 700 as a multi-processor system. The main memory 725 stores, among other things, instructions and/or data for execution by the processor device 710. The main memory 725 may include banks of dynamic random access memory (DRAM), as well as cache memory.

System 700 may further include a mass storage device 730, peripheral device(s) 740, portable non-transitory storage medium device(s) 750, input control device(s) 780, a graphics subsystem 760, and/or an output display interface 770. For explanatory purposes, all components in system 700 are shown in FIG. 7 as being coupled via the bus 705. However, the system is not so limited. Elements of system 700 may be coupled via one or more data transport means. For example, the processor device 710 and/or the main memory 725 may be coupled via a local microprocessor bus. The mass storage device 730, peripheral device(s) 740, portable storage medium device(s) 750, and/or graphics subsystem 760 may be coupled via one or more input/output (I/O) buses. The mass storage device 730 may be a non-volatile storage device for storing data and/or instructions for use by the processor device 710. The mass storage device 730 may be implemented, for example, with a magnetic disk drive or an optical disk drive.

In a software embodiment, the mass storage device 730 is configured for loading contents of the mass storage device 730 into the main memory 725.

Mass storage device 730 additionally stores instructions which, when executed by processor device 710, operates as a query understanding system 102, which performs the functions described above. Particularly, the instructions cause processor device 710 to act as a non-focused query quantifier 200 and a non-focused query predictor 210.

In some embodiments, standalone feature analyzer 202, reference dependent feature analyzer 204, and interaction feature analyzer 206 of the non-focused query quantifier 200, and feature threshold predictor 212, training model predictor 214 and ensemble predictor 216 of non-focused query predictor 210 are individual components each having a processing device such as processor device 710. Alternatively, any combination of the standalone feature analyzer 202, reference dependent feature analyzer 204, and interaction feature analyzer 206 of the non-focused query quantifier 200, and feature threshold predictor 212, training model predictor 214 and ensemble predictor 216 of non-focused query predictor 210 share one or more processing devices 710. In either configuration, the mass storage device 730 stores instructions, which when executed by the one or more processor devices 710 cause standalone feature analyzer 202, reference dependent feature analyzer 204, and interaction feature analyzer 206 of the non-focused query quantifier 200, and feature threshold predictor 212, training model predictor 214 and ensemble predictor 216 of non-focused query predictor 210 to perform the functions described above, correspondingly.

The portable storage medium device 750 operates in conjunction with a nonvolatile portable storage medium, such as, for example, flash memory, to input and output data and code to and from the system 700. In some embodiments, the software for storing information may be stored on a portable storage medium, and may be inputted into the system 700 via the portable storage medium device 750. The peripheral device(s) 740 may include any type of computer support device, such as, for example, an input/output (I/O) interface configured to add additional functionality to the system 700. For example, the peripheral device(s) 740 may include a network interface card for interfacing the system 700 with a network 720.

The input control device(s) 780 provides a portion of the user interface for a user of the system 700. The input control device(s) 780 may include a keypad and/or a cursor control device. The keypad may be configured for inputting alphanumeric characters and/or other key information. The cursor control device may include, for example, a handheld controller or mouse, a trackball, a stylus, and/or cursor direction keys. The system 700 may include an optional graphics subsystem 760 and output display 770 to display textual and graphical information. The output display 770 may include a display such as a CSTN (Color Super Twisted Nematic), TFT (Thin Film Transistor), TFD (Thin Film Diode), OLED (Organic Light-Emitting Diode), AMOLED display (Active-matrix organic light-emitting diode), and/or liquid crystal display (LCD)-type displays. The displays can also be touchscreen displays, such as capacitive and resistive-type touchscreen displays.

The graphics subsystem 760 receives textual and graphical information, and processes the information for output to the output display 770.

Input control devices 780 can control the operation and various functions of system 700.

Input control devices 780 can include any components, circuitry, or logic operative to drive the functionality of system 700. For example, input control device(s) 780 can include one or more processors acting under the control of an application.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-7 are presented for example purposes only. The architecture of the example embodiments presented herein is sufficiently flexible and configurable, such that it may be utilized (and navigated) in ways other than that shown in the accompanying figures.

In addition, it should be understood that the FIGS. 1-7 are presented for example purposes only. The architecture of the example embodiments presented herein is sufficiently flexible and configurable, such that it may be utilized (and navigated) in ways other than that shown in the accompanying figures. Not all of the components are required to practice the invention, and variations in the arrangement and type of the components may be made without departing from the spirit or scope of the invention. As used herein, the term "component" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A query understanding system, comprising:
   at least one processor; and
   non-transitory computer-readable storage having stored thereon instructions which, when executed by the at least one processor, cause the at least one processor to:
   generate a plurality of non-focused query features that quantify a non-focused query; and
   generate a prediction associated with the non-focused query based on the plurality of non-focused query features, including to apply a set of threshold-based rules on the plurality of non-focused query features, the prediction being a probability that the non-focused query will generate results that include under-served content.

2. The query understanding system according to claim 1, wherein the instructions, when executed by the at least one processor, further cause the at least one processor to:
   generate standalone features based on the plurality of non-focused query features;
   generate reference dependent features based on the plurality of non-focused query features; and
   generate interaction features based on the plurality of non-focused query features.

3. The query understanding system according to claim 1, wherein the instructions, when executed by the at least one processor, further cause the at least one processor to:
   analyze threshold-based predictors by, for each non-focused query feature:

compute the prediction based on an evolving threshold; and test pairwise combinations between the plurality of non-focused query features based on a pair of non-focused query features and thresholds using a logical AND operation between two non-focused query features, correspondingly.

4. The query understanding system according to claim 1, wherein the instructions, when executed by the at least one processor, further cause the at least one processor to:
estimate a plurality of output labels of a query using a random forest classifier;
flag at least one of the plurality of output labels as a weak supervision label; and
use a probability of a label assignment as a sample weight for training a neural network.

5. The query understanding system according to claim 2, wherein the instructions, when executed by the at least one processor, further cause the at least one processor to:
apply an ensemble model to predict patterns based on classifiers associated with (i) the standalone features, (ii) the reference dependent features, (iii) the interaction-based features, or (iv) any combination of (i), (ii), or (iii).

6. The query understanding system according to claim 5, wherein the instructions, when executed by the at least one processor, further cause the at least one processor to:
apply the ensemble model based on predictions of a threshold-based classifier and a neural network classifier; and
communicate an indication to present under-served content to a user when the threshold-based classifier or the neural network classifier predicts a query to be a non-focused query.

7. The query understanding system according to claim 1, wherein reference queries are queries that result in under-served content consumed by users.

8. The query understanding system according to claim 2, wherein:
the standalone features include (i) a number of under-served content consumed by users for the non-focused query, (ii) a number of under-served content displayed for the non-focused query, or (iii) both (i) and (ii);
the reference dependent features include: (i) an overlap in clicked results, (ii) an overlap in displayed results, (iii) an embedding distance; (iv) a knowledge graph (KG) distance, or (v) any combination of (i), (ii), (iii) and (iv); and
the interaction features include a click entropy.

9. A method for query understanding, comprising:
generating a plurality of non-focused query features that quantify a non-focused query; and
generating a prediction associated with the non-focused query based on the plurality of non-focused query features, including applying a set of threshold-based rules on the plurality of non-focused query features, the prediction being a probability that the non-focused query will generate results that include under-served content.

10. The method for query understanding according to claim 9, further comprising:
generating standalone features based on the plurality of non-focused query features;
generating reference dependent features based on the plurality of non-focused query features; and
generating interaction features based on the plurality of non-focused query features.

11. The method for query understanding according to claim 9, further comprising:
for each non-focused query feature:
computing the prediction of under-served content based on an evolving threshold; and
testing pairwise combinations between the plurality of non-focused query features based on a pair of non-focused query features and thresholds using a logical AND operation between two non-focused query features, correspondingly.

12. The method for query understanding according to claim 9, further comprising:
estimating a plurality of output labels of a query using a random forest classifier;
flagging at least one of the plurality of output labels as a weak supervision label; and
using a probability of a label assignment as a sample weight for training a neural network.

13. The method for query understanding according to claim 10, further comprising:
applying an ensemble model to predict patterns based on classifiers associated with (i) the standalone features, (ii) the reference dependent features, (iii) the interaction-based features, or (iv) any combination of (i), (ii), or (iii).

14. The method for query understanding according to claim 13, further comprising:
applying the ensemble model based on predictions of a threshold-based classifier and a neural network classifier; and
communicating an indication to present under-served content to a user when the threshold-based classifier or the neural network classifier predicts a query to be a non-focused query.

15. The method for query understanding according to claim 9, wherein reference queries are queries that result in under-served content consumed by users.

16. The method for query understanding according to claim 10, wherein:
the standalone features include (i) a number of under-served content consumed by users for the non-focused query, (ii) a number of under-served content displayed for the non-focused query, or (iii) both (i) and (ii);
the reference dependent features include: (i) an overlap in clicked results, (ii) an overlap in displayed results, (iii) an embedding distance; (iv) a knowledge graph (KG) distance, or (v) any combination of (i), (ii), (iii) and (iv); and
the interaction features include a click entropy.

17. A non-transitory computer-readable medium having stored thereon one or more sequences of instructions for causing one or more processors to perform a method comprising:
generating a plurality of non-focused query features that quantify a non-focused query;
generating a prediction associated with the non-focused query based on the plurality of non-focused query features, including applying a set of threshold-based rules on the plurality of non-focused query features, the prediction being a probability that the non-focused query will generate results that include under-served content.

18. The non-transitory computer-readable medium of claim 17, wherein the method further comprises:
estimating a plurality of output labels of a query using a random forest classifier;

flagging at least one of the plurality of output labels as a weak supervision label; and using a probability of a label assignment as a sample weight for training a neural network.

19. The non-transitory computer-readable medium of claim 17, wherein the method further comprises:

generating standalone features based on the plurality of non-focused query features;

generating reference dependent features based on the plurality of non-focused query features; and generating interaction features based on the plurality of non-focused query features.

20. The non-transitory computer-readable medium of claim 19, wherein the method further comprises:

applying an ensemble model to predict patterns based on classifiers associated with (i) the standalone features, (ii) the reference dependent features, (iii) the interaction-based features, or (iv) any combination of (i), (ii), or (iii).

21. The non-transitory computer-readable medium of claim 20, wherein the method further comprises:

applying the ensemble model based on predictions of a threshold-based classifier and a neural network classifier; and communicating an indication to present under-served content to a user when the threshold-based classifier or the neural network classifier predicts a query to be a non-focused query.

* * * * *